(12) United States Patent
Kim et al.

(10) Patent No.: US 8,718,914 B2
(45) Date of Patent: May 6, 2014

(54) METHOD AND DEVICE FOR PROVIDING ECO-DRIVING INFORMATION

(75) Inventors: Jae Woong Kim, Gyeonggi-do (KR); Jae Hyun Park, Seoul (KR); Joon Hyung Park, Gyeonggi-do (KR); Sang Hun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/524,133

(22) Filed: Jun. 15, 2012

(65) Prior Publication Data
US 2013/0124077 A1 May 16, 2013

(30) Foreign Application Priority Data
Nov. 14, 2011 (KR) .................. 10-2011-0118528

(51) Int. Cl.
*G05D 13/00* (2006.01)
(52) U.S. Cl.
USPC ............. 701/123; 701/73; 701/74; 701/110; 701/121; 701/497
(58) Field of Classification Search
USPC ........ 180/69.3, 170–171, 292, 312, 338, 364, 180/423; 701/7, 22, 73–74, 79–81, 86, 93, 701/96, 103–104, 110, 112, 121, 123, 497
See application file for complete search history.

(56) References Cited

U.S. PATENT DOCUMENTS

| | | | | |
|---|---|---|---|---|
| 5,913,917 A * | 6/1999 | Murphy | .................. | 701/123 |
| 6,018,694 A * | 1/2000 | Egami et al. | .................. | 701/102 |
| 6,567,734 B2 * | 5/2003 | Bellinger et al. | ............... | 701/51 |
| 7,024,306 B2 * | 4/2006 | Minami et al. | ................ | 701/123 |
| 7,925,426 B2 * | 4/2011 | Koebler et al. | ................ | 701/123 |
| 2005/0021222 A1 * | 1/2005 | Minami et al. | ................ | 701/123 |
| 2005/0027423 A1 * | 2/2005 | Minami et al. | ................ | 701/51 |
| 2007/0112475 A1 * | 5/2007 | Koebler et al. | ................ | 701/1 |
| 2008/0262712 A1 * | 10/2008 | Duty et al. | ................ | 701/123 |
| 2011/0313647 A1 * | 12/2011 | Koebler et al. | ................ | 701/123 |
| 2012/0059560 A1 * | 3/2012 | Balton et al. | ................ | 701/54 |
| 2012/0197500 A1 * | 8/2012 | Sujan et al. | ................ | 701/51 |
| 2012/0197501 A1 * | 8/2012 | Sujan et al. | ................ | 701/51 |
| 2013/0179062 A1 * | 7/2013 | Yasushi et al. | ................ | 701/123 |

FOREIGN PATENT DOCUMENTS

| JP | 2011-102801 A | 5/2011 |
|---|---|---|
| KR | 10-2000-0025188 A | 5/2000 |
| KR | 10-2011-0116890 A | 10/2011 |

* cited by examiner

*Primary Examiner* — Mary Cheung
*Assistant Examiner* — Atul Trivedi
(74) *Attorney, Agent, or Firm* — Edwards Wildman Palmer LLP; Peter F. Corless

(57) ABSTRACT

Disclosed is a device and method of providing a driver with eco-driving information. More specifically, the disclosed method and device induces a driver to operate a vehicle in an eco-friendly manner by computing for and displaying to the driver a fuel efficiency oriented vehicle speed that maximizes the vehicle's driving distance based on the vehicle's current weight and electrical load.

3 Claims, 3 Drawing Sheets

METHOD AND DEVICE FOR PROVIDING ECO-DRIVING INFORMATION

CROSS-REFERENCE TO RELATED APPLICATION

This application claims under 35 U.S.C. §119(a) the benefit of Korean Patent Application No. 10-2011-0118528 filed on Nov. 14, 2011, the entire contents of which are incorporated herein by reference.

BACKGROUND (a) Technical Field

The present invention relates to a method and a device for providing vehicle eco-driving information, and more particularly, to a technology configured to maximize the driving distance of a vehicle by providing the driver a vehicle speed that maximizes the driving distance in an environment-friendly vehicle such as a fuel cell vehicle or an electric vehicle.

(b) Background Art

Eco-driving a vehicle typically refers to maximizing the driving distance of a vehicle while reducing fuel consumption by avoiding sudden acceleration, stops, and the like and maximizing the driving inertia provided by the vehicle to minimize damage to the environment caused by inefficient fuel consumption.

In a fuel cell vehicle or an electric vehicle, however, the fuel mileage that a particular vehicle is able to maintain is highly dependent upon the weight of the vehicle and an electrical load required.

So far, in the conventional art, since a driver cannot intuitively determine the weight of the vehicle or the electrical load used in a present vehicle, it is difficult for a driver to effectively drive the vehicle in an eco friendly fashion.

Matters described as the background art are just to improve the background of the present invention, but it should not be understood that the matters correspond to the related art which has been already known to those skilled in the art.

SUMMARY OF THE DISCLOSURE

The present invention has been made in an effort to provide a method and a device for providing a driver with eco-driving information of a vehicle to a driver to induce the driver to drive the vehicle in an eco-friendly manner by presenting a fuel efficiency oriented vehicle speed that maximizes the driving distance of the vehicle according to present weight and electrical load of the vehicle.

An exemplary embodiment of the present invention provides a method for providing eco-driving information of a vehicle includes: calculating a present weight of the vehicle through a vehicle weight calculating process; computing an electrical load used to by a plurality of auxiliary machinery within the vehicle through an electrical load computing process; calculating a fuel efficiency oriented vehicle speed that provides a maximum driving distance for the vehicle according to current weight of the vehicle calculated in the vehicle weight calculation process and the current electrical load calculated in the electrical load computing process, from a map related to vehicle driving distance according to the vehicle's current weight, the electrical load, and the vehicle speed; and informing a driver of the calculated vehicle speed computed in the vehicle speed computing process through an information providing process.

Further, another exemplary embodiment of the present invention provides a device for providing eco-driving information of a vehicle includes a vehicle weight calculating unit configured to calculate a weight of the vehicle by receiving data related to the vehicle's weight; an electrical load computing unit configured to compute a combined electrical load each of a plurality of auxiliary machinery presently being used in the vehicle; a vehicle speed calculating unit configured to calculate a fuel efficiency oriented vehicle speed that maximizes the vehicles driving distance according to a vehicle weight calculated in the vehicle weight calculating unit and the electrical load calculated in the electrical load calculating unit; and a display device configured to display the calculated fuel efficiency oriented vehicle speed to a user.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
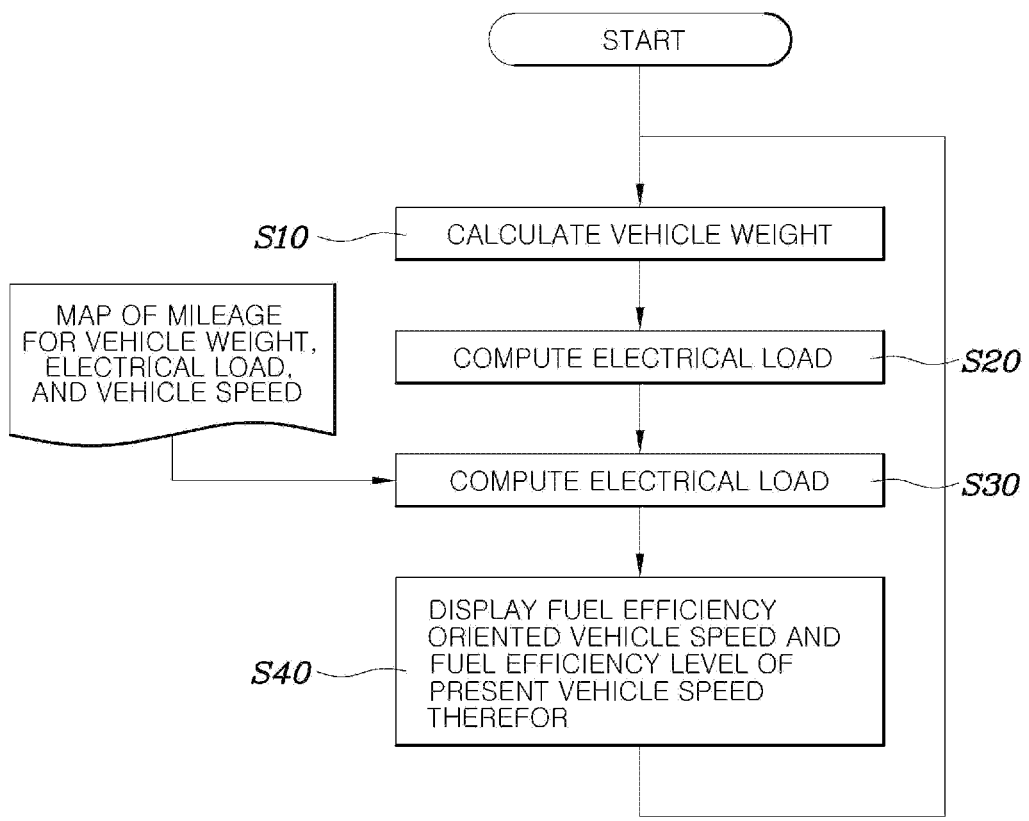
FIG. 1 is a flowchart showing a method for providing eco-driving information of a vehicle according to an exemplary embodiment of the present invention.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
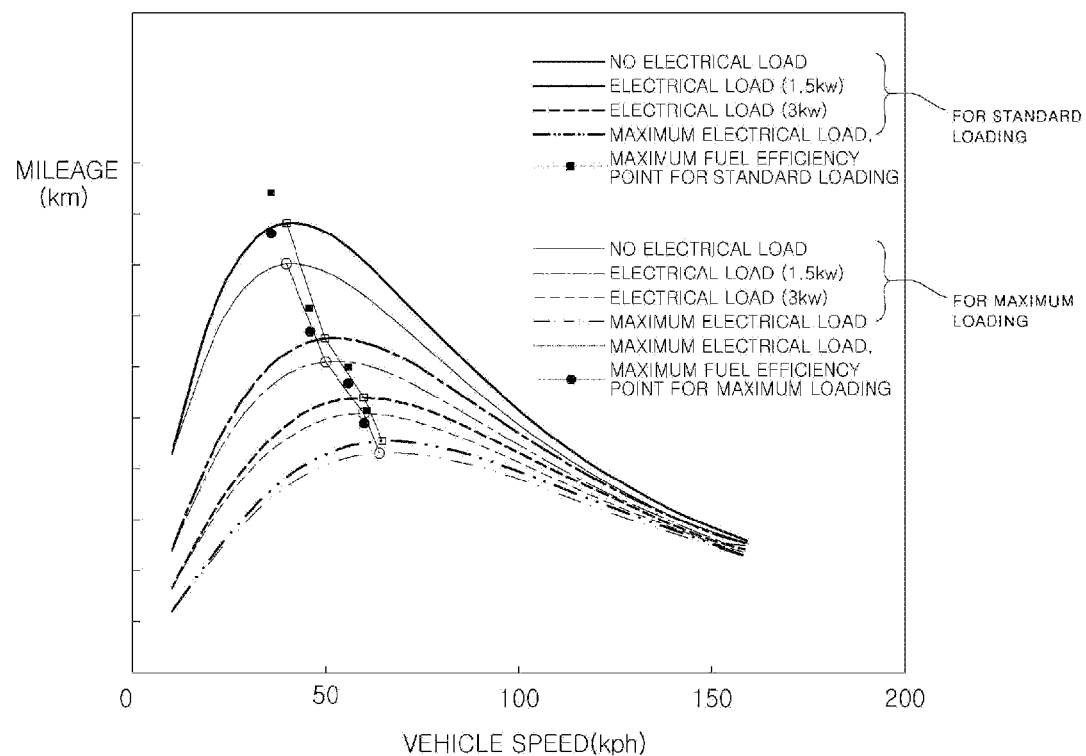
FIG. 2 is a diagram showing a map relating to a driving distance for a vehicle weight, an electrical load, and a vehicle speed used in the method for providing eco-driving information of a vehicle according to the exemplary embodiment of the present invention.

Referring to FIGS. 1 and 2, a method for providing eco-driving information of a vehicle according to an exemplary embodiment of the present invention includes a vehicle weight calculating process (S10) that calculates a present weight of the vehicle, an electrical load computing process (S20) that computes a combined electrical load used to drive a plurality of auxiliary machinery currently being used by the vehicle, a vehicle speed calculating process (S30) that calculates a fuel efficiency oriented vehicle speed that maximizes a vehicle's driving distance according to the current weight calculated in the vehicle weight calculating process (S10) and the current combined electrical load calculated in the electrical load computing process (S20), from a map related to a vehicle's driving distance for the vehicle weight, the electrical load, and the vehicle speed, and an information providing process (S40) that informs a driver of the vehicle speed computed in the vehicle speed computing process (S30).

That is, a current weight of the vehicle fluctuates and thus the vehicle's current weight is calculated in real time by using various state values of the vehicle, the electrical load used in the auxiliary machinery such as air-conditioning devices, electrical heating devices, navigation systems, and the like is computed, and the vehicle speed that provides for a maximum driving distance under the present vehicle weight and electrical load is acquired from the map shown in FIG. 2 to be displayed to a driver. Thus, by providing the driver with an ideal speed at which the vehicle is inducing a driver to control the vehicle speed so as to achieve a maximum driving distance and thereby provide an eco friendly driving state.

For reference, FIG. 2 shows graphical representation of (1) an example in which no electrical load is provided in a standard loading state in which two people are within a target vehicle, (2) an example showing the relationship between the driving distance and vehicle speeds when the electrical load is 1.5 KW, 3 KW, and at a maximum value respectively for both when the vehicle is maximally loaded and standardly loaded (i.e., 2-5 people, 2 being standard, 5 being maximum. Thus, graphical representations like the one illustrated in FIG. 2 may be utilized to map the driving distance of the vehicle at a particular speed for each electrical load and calculated vehicle weight.

In the vehicle weight calculating process (S10), the weight of the vehicle is calculated from a power consumption of a vehicle driving motor, an air density, an air resistance coefficient, a projected area of the vehicle, the vehicle speed, a friction coefficient of a current road, a gravity acceleration, and a slope of the current road. That is, in the vehicle weight calculating process (S10), the weight of the vehicle is calculated by the following equation.

$$m = \left(TF + \frac{1}{2}\rho_{air}C_d A V^2\right) \Big/ (\mu g \cos\theta + g\sin\theta)$$

Wherein, m is the Vehicle weight, TF is the driving force, $\rho_{air}$ is the air density, $C_d$ is the air resistance coefficient, A is the projected area of vehicle, V is the vehicle speed, $\mu$: is the current coefficient of current road, g is gravitational acceleration, and $\theta$ is the slope of current road.

The driving force is acquired from a relationship of TF=P/V. Therefore, P represents the power consumption of the driving motor and V represents the vehicle speed.

The air density $\rho_{air}$ uses a standard density of general air and the friction coefficient $\mu$ of the current road uses a friction coefficient of a general road, the current road slope $\theta$ uses values supplied from data provided by GPS information and a slope sensor and in some cases when $\theta$ is a relatively small value substantially close to 0, the $\theta$ is regarded as 0.

In the electrical load computing process (S20), the electrical load of the auxiliary machinery is computed by summing up (combining) the electrical loads of all the auxiliary machinery that is currently being used by, e.g., monitoring a controller area network (CAN) of the vehicle.

In the information providing process (S40), a fuel efficiency level of the present vehicle speed for the fuel efficiency oriented vehicle speed is preferably compared and displayed together with the fuel efficiency oriented vehicle speed computed in the vehicle speed computing process (S30). Therefore, for example, a display method of FIG. 3 may be used.

Figure 4:
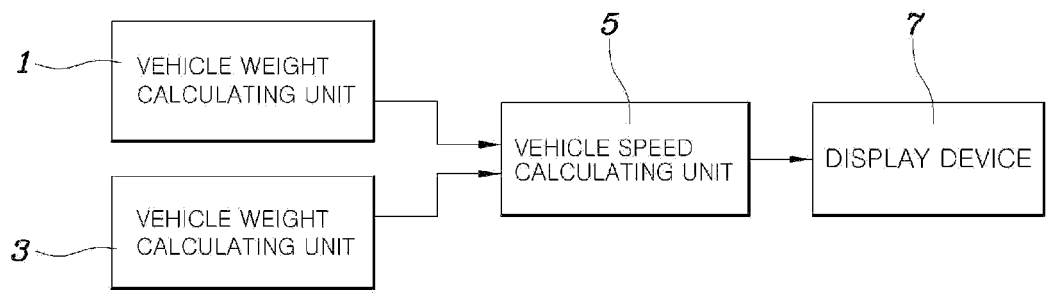
FIG. 4 is a diagram showing a configuration of a device for providing eco-driving information of a vehicle according to an exemplary embodiment of the present invention.

As shown in FIG. 4, a device for providing eco-driving information of a vehicle according to an exemplary embodiment of the present invention for implementing the method for providing eco-driving information of a vehicle includes a vehicle weight calculating unit 1 configured to calculate a current weight of the vehicle by receiving data from a plurality of devices throughout the vehicle, an electrical load computing unit 3 configured to compute an electrical load of an auxiliary machinery currently being used by the vehicle, a vehicle speed calculating unit 5 configured to calculate a fuel efficiency oriented vehicle speed that maximizes a vehicle' driving distance according to the vehicle weight calculated in the vehicle weight calculating unit 1 and the electrical load calculated in the electrical load calculating unit 3, and a display device 7 configured to display the calculated fuel efficiency oriented vehicle speed to a user.

The vehicle weight calculating unit 1 is configured to calculate the weight of the vehicle from the power consumption of a vehicle driving motor, an air density, an air resistance coefficient, a projected area of the vehicle, the vehicle speed, a friction coefficient of a current road, a gravity acceleration, and a slope of the current road.

The electrical load computing unit 3 is configured to compute the electrical load of the auxiliary machinery by summing up electrical loads of all auxiliary machineries being used by monitoring CAN of the vehicle.

Further, the vehicle weight calculating unit 1, the electrical load computing unit 3, and the vehicle speed calculating unit 5 may be packaged in a single chip which is processed by a processor or a controller and the map of the correlated driving distance based on the vehicle's current weight, the electrical load, and the vehicle speed used by the vehicle speed calculating unit 5 may be embedded in the chip as well or on any other form of storage device.

Figure 3:
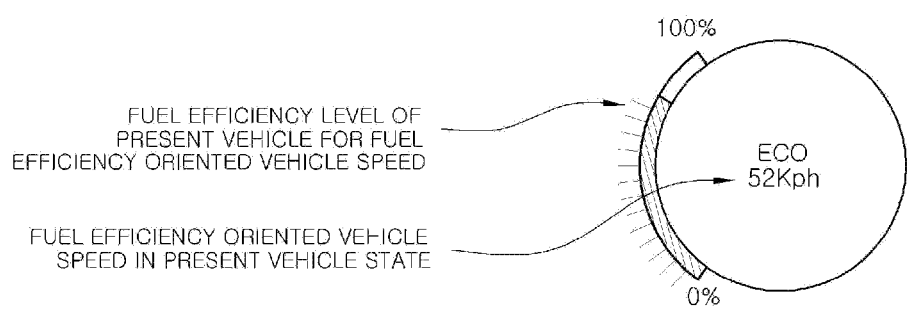
FIG. 3 is a diagram showing one example of displaying an eco-driving state to a user according to an exemplary embodiment of the present invention.

The display device 7 is also configured to compare and schematically display a fuel efficiency level of the present vehicle speed as well as displaying the fuel efficiency oriented vehicle speed calculated in the vehicle calculating unit 5 as shown in FIG. 3 so that the driver may efficiently compare their current driving style to the proposed eco-friendly driving style provided by the present invention.

Furthermore, the control logic of the present invention may be embodied as non-transitory computer readable media on a computer readable medium containing executable program instructions executed by a processor, controller, chip or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Advantageously, a driver provided with the illustrative embodiment of the present invention may be induced to drive a vehicle in an eco-driving state due to the efficient display of a fuel efficiency oriented vehicle speed that maximizes the driving distance of a vehicle based on the vehicles current weight and electrical load. Thus a driver may be inclined to drive in a more fuel efficient manner based on the information provided to the driver.

Furthermore, although the above exemplary embodiments are described as using a plurality of units to perform the above process, it is understood that the above processes may also be performed by a single controller or unit.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A device for providing eco-driving information of a vehicle, comprising:
 a vehicle weight calculating unit configured to calculate a current weight of the vehicle based on data received from a plurality of devices within the vehicle;
 an electrical load computing unit configured to compute an electrical load of auxiliary machinery currently being used in the vehicle;
 a vehicle speed calculating unit configured to calculate, using a mileage map, a fuel efficiency oriented vehicle speed that maximizes the vehicle's driving distance according to the calculated vehicle weight and the calculated electrical load; and
 a display device configured to display the calculated fuel efficiency oriented vehicle speed to a user,
 wherein the weight of the vehicle is calculated from the power consumption of a vehicle driving motor, an air density, an air resistance coefficient, a projected area of the vehicle, the vehicle speed, a friction coefficient of a road the vehicle is currently driving on, a gravity acceleration, and a slope of the road the vehicle is currently driving on, and
 wherein the weight of the vehicle is calculated by the following equation $$m = \left(TF + \frac{1}{2}\rho_{air}C_d A V^2\right) \Big/ (\mu g\cos\theta + g\sin\theta)$$

where, m is a vehicle weight, TF is driving force, $\rho_{air}$ is air density, $C_d$ is an air resistance coefficient, A is a projected area of vehicle, V is the vehicle's current speed, $\mu$ is a friction coefficient of the current road, g is the gravitational acceleration of the vehicle, and $\theta$ is the current slope of the road, and
 the driving force is acquired from a relationship of TF=P/V, wherein P represents the power consumption of the driving motor and V represents the vehicle speed,
 where the vehicle weight calculating unit, the electrical load computing unit, and the vehicle speed calculating unit are incorporated into a single chip, and
 where the mileage map that includes the vehicle weight, the electrical load, and the vehicle speed is embedded into the single chip.

2. The device for providing eco-driving information of a vehicle of claim 1, wherein the electrical load computing unit computes the electrical load of the auxiliary machinery by summing up electrical loads of all used auxiliary machineries by monitoring CAN of the vehicle.

3. The device for providing eco-driving information of a vehicle of claim 1, wherein the display device compares and schematically displays a fuel efficiency level of the current vehicle speed as well as displaying the fuel efficiency oriented vehicle speed.

* * * * *